US006797166B1

United States Patent
Hambley et al.

(10) Patent No.: US 6,797,166 B1
(45) Date of Patent: Sep. 28, 2004

(54) UNDERDRAIN APPARATUS

(75) Inventors: Philip Hambley, Calgary (CA); David M. Hambley, Calgary (CA); Cole Carothers, North Salt Lake City, UT (US); Govert Bassett, II, Sandy, UT (US)

(73) Assignee: Newtech Filter Systems, Inc., Calgary (CA)

(*) Notice: Subject to any disclaimer, the term of this patent is extended or adjusted under 35 U.S.C. 154(b) by 0 days.

(21) Appl. No.: 09/561,767

(22) Filed: Apr. 29, 2000

Related U.S. Application Data

(63) Continuation-in-part of application No. 09/303,306, filed on Apr. 30, 1999.

(51) Int. Cl.[7] .............................................. B01D 24/38
(52) U.S. Cl. ...................... 210/274; 210/275; 210/291; 210/293
(58) Field of Search ............................... 210/274, 275, 210/289, 291, 293

(56) References Cited

U.S. PATENT DOCUMENTS

| | | | |
|---|---|---|---|
| 4,331,542 A | * 5/1982 | Emrie | 210/293 |
| 4,619,765 A | 10/1986 | Roberts | 210/289 |
| 4,627,923 A | 12/1986 | Ross | 210/744 |
| 4,771,804 A | 9/1988 | Morales | 137/412 |
| 5,019,259 A | 5/1991 | Hambley | 210/274 |
| 5,149,427 A | 9/1992 | Brown et al. | 210/274 |
| 5,269,920 A | 12/1993 | Brown et al. | 210/274 |
| 5,865,999 A | 2/1999 | Shea et al. | 210/289 |
| 5,976,370 A | * 11/1999 | Medworth | 210/291 |

FOREIGN PATENT DOCUMENTS

| | | |
|---|---|---|
| WO | WO 91/10493 | 7/1991 |
| WO | WO 97/40907 | 11/1997 |

OTHER PUBLICATIONS

AWI brochure, "The AWI Phoenix Underdrain System", date unknown but at least as early as Apr. 30, 1998.

* cited by examiner

Primary Examiner—Ivars C. Cintins
(74) Attorney, Agent, or Firm—John Russell Uren

(57) ABSTRACT

A filter underdrain apparatus and a method for manufacturing such apparatus. The apparatus includes a cover member, a water orifice member and a bottom member, each being individual pieces. The cover is placed over the water orifice member and connected thereto by welding. The bottom member is likewise connected to the cover and water orifice members by welding. A water passageway and an air passageway are defined in the inside of the assembled members. Water egress from the water passageway is provided by holes in the water orifice member and the cover. Air egress from the air passageway is provided by holes in the cover.

8 Claims, 18 Drawing Sheets

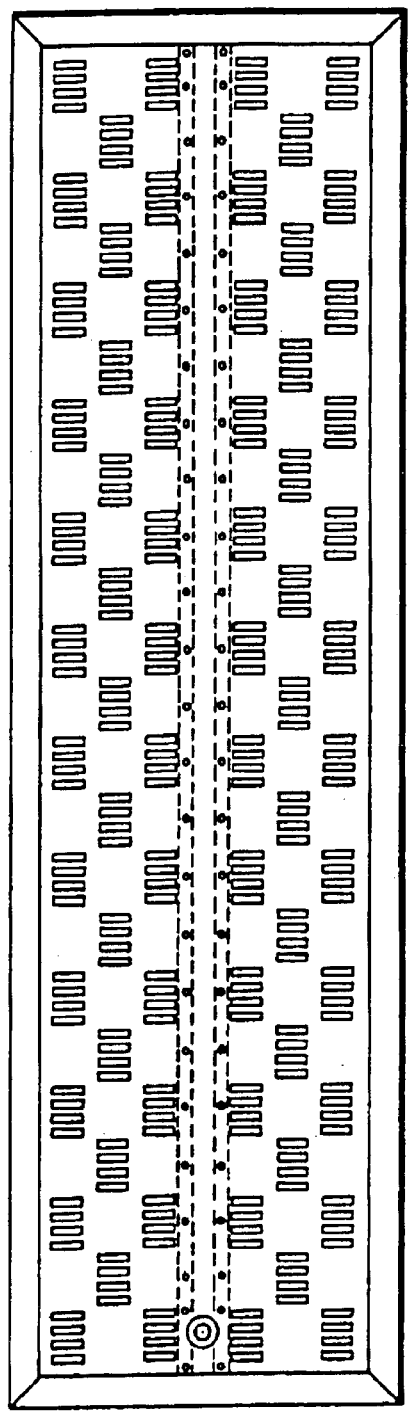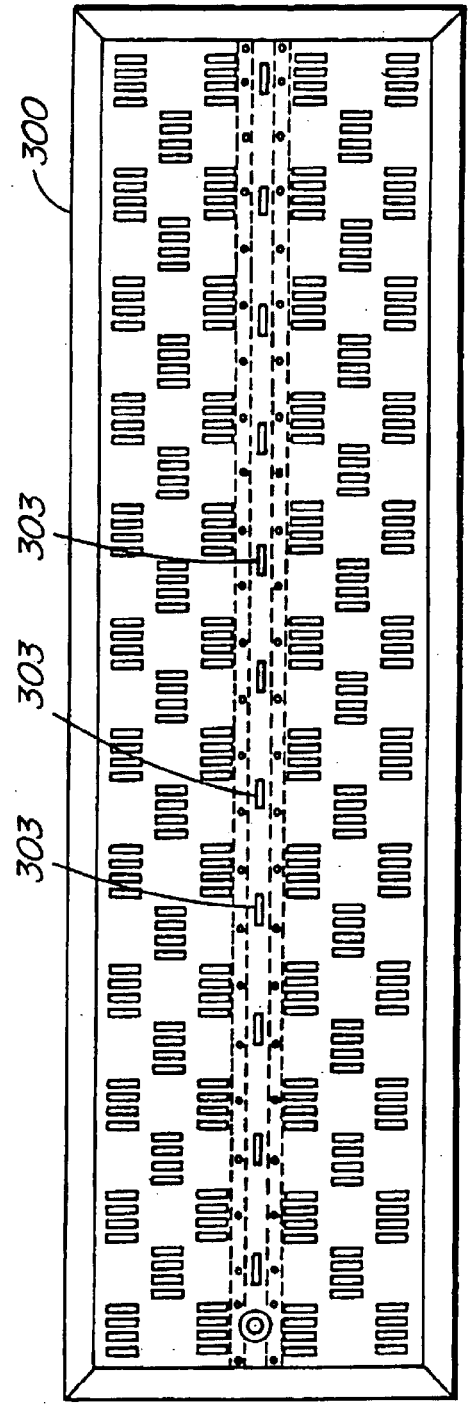
FIG. 16C
FIG. 16D

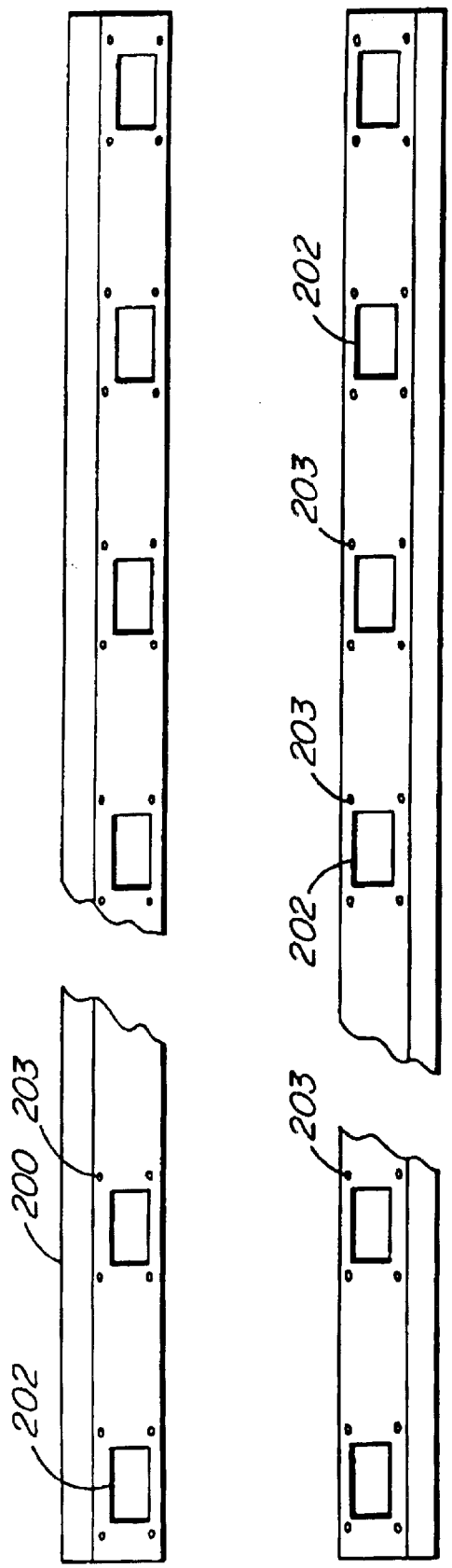
FIG. 20A
FIG. 20B
FIG. 20C

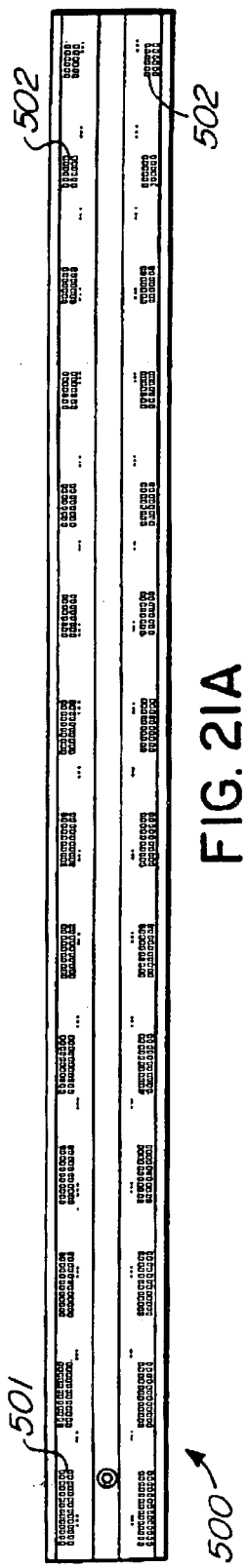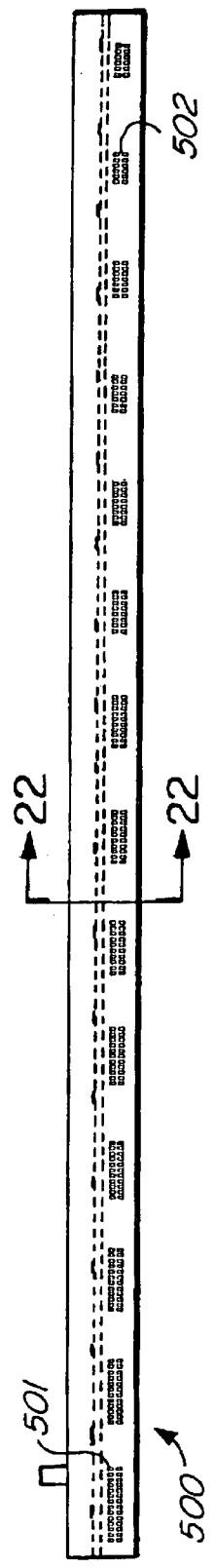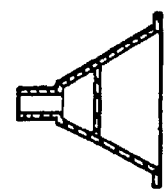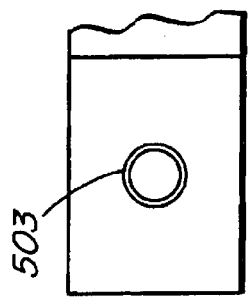
FIG. 21A
FIG. 21B
FIG. 21C
FIG. 22

UNDERDRAIN APPARATUS

CROSS-REFERENCE TO RELATED APPLICATION

This application is a continuation-in-part of U.S. application Ser. No. 09/303,306 filed Apr. 30, 1999.

This invention relates to an underdrain apparatus and more particularly, to an improved underdrain apparatus and to a method of manufacturing the underdrain apparatus.

BACKGROUND OF THE INVENTION

The traditional rapid sand filter has been a reliable performer in potable water treatment and the mechanics of the operation and performance of such a filter have remained largely unchanged over the years. The filter is a straining device comprising a bottom underdrain collection system equipped with slotted strainers or the like which holds a layer of filter sand. Above the sand layer is a layer (or layers) of hard coal media which is coarser. A wash water trough is located above the media layers and is used to direct unfiltered water into the filter as well as to channel backwash rinse water to a waste outlet. A backwashing cycle is required when the filter media has substantial head loss during operation, sometimes occurring several times a day due to particle buildup in the filter. Backwashing fluidizes the media, rinses out the particles from the interstitial voids and reclassifies the layers of media A problem associated with backwashing is the non-uniform or uneven water distribution which occurs because of the momentum of the water discharging from the perforated header or channel. Water at high velocity across an orifice will not be discharged through the orifice as readily as when flowing at lower velocity. Backwash discharge from the underdrain will be greatest in those portions of the underdrain furthest away from the backwash water inlet. Such unequal flows cause undesirable channelling in the media which reduces the efficiency of the backwash operation and results in filtering problems.

A further problem with many types of filter is the requirement for a support gravel layer immediately above the underdrain upon which the sand layer rests. This requirement results in a deeper overall bed and increased material requirements for the filter installation. The need for a support gravel layer also restricts the available depth for the sand and coal layers which reduces the filtration effectiveness.

The above-identified problems are discussed in various patents. Such prior art patents include U.S. Pat. No. 3,956,134 (Sturgill) dated May 1976 and entitled UNDERDRAIN FOR WATER FILTRATION SYSTEM; U.S. Pat. No. 4,214,992 (Sasano et al) dated August 1978 and entitled WATER COLLECTING AND DISTRIBUTING APPARATUS DISPOSED IN A LOWER PORTION OF HIGH SPEED FILTER BASIN; U.S. Pat. No. 4,331,542 (Emrie) dated August 1980 and entitled UNDERDRAIN UNIT WITH AIR/WATER BACKWASH FOR GRANULAR FILTRATION SYSTEM; U.S. Pat. No. 4,923,606 (Gresh et al) dated February 1988 and entitled PLASTIC JACKETED FILTER UNDERDRAIN BLOCK; U.S. Pat. No. 4,995,990 (Weston) dated April 1989 and entitled AIR AND WATER DISTRIBUTION CONDUIT; U.S. Pat. No. 5,068,034 (Walter) dated May 1990 and entitled PURIFICATION UNDERDRAIN WITH MEANS COMPENSATE FOR FLOW AND PRESSURE DIFFERENCES BETWEEN LATERALS; U.S. Pat. No. 5,160,614 (Brown) dated February 1992 and entitled AIR DUCT BLOCK FOR AIR/WATER UNDERDRAIN SYSTEMS IN GRAVITY FILTERS; U.S. Pat. 5,149,427 (Brown et al) dated September 1992 and entitled CAP FOR UNDER DRAINS IN GRAVITY FILTERS; U.S. Pat. No. 5,413,710 (Roberts et al) dated May 1995 and entitled LATERAL UNDERDRAIN; and U.S. Pat. No. 5,462,664 (Neuspiel) dated October 1995 and entitled FILTER UNDERDRAIN MODULE AND UNDERDRAIN SYSTEM.

The prior art identified above suffers from other problems, such problems including that the devices disclosed are not readily adaptable for retrofitting to existing filter installations; that the devices are prone to plugging with grit flushed in during the backwash cycle and are therefore less resistant to structural failure during the large upward hydraulic thrust generated during backwash; that the devices are expensive to purchase and are difficult and expensive to install, some requiring tedious grouting procedures or cumbersome and expensive false bottom structures; that many of the devices are constructed from tile or porous tile or the like and are therefore fragile and subject to breakage during installation while inadequate corrosion resistance is also present; and that some devices require support gravel layering.

Our earlier U.S. Pat. No. 5,019,259 (Hambley) dated May 28, 1991 and entitled FILTER UNDERDRAIN APPARATUS WITH PARTITIONED DISTRIBUTOR CONDUITS, the contents of which are incorporated herein by reference, teaches a filter underdrain apparatus which includes a steel flute or arch forming a plurality of horizontal distributor conduits. The conduits are in juxtaposed, laterally spaced relationship and are constructed to define alternating conduits and troughs of a filter underdrain. This apparatus functions well with or without support gravel and reduces backwash water maldistribution by varying the diameter of the water inlet/outlet orifices arranged along the length of the water conduits. While this apparatus is effective in overcoming many of the problems of the prior art, the effective diameter of each individual inlet/outlet orifice in the flute or arch needed to be calculated and attendant tool changes were required during the manufacturing process to accommodate the variations in orifice size along the flute.

SUMMARY OF THE INVENTION

According to one aspect of the invention, there is provided an underdrain apparatus for water treatment facilities comprising a cover member, a water orifice member having an upper surface and a bottom member having an inside surface, said assembled apparatus having a first air passageway defined between said cover and said upper surface of said water orifice member, a first water passageway defined by said inside surface of said bottom member and said water orifice member and secondary water orifices in said water orifice member to allow the egress of water from said first water passageway.

According to a further aspect of the invention, there is provided a method of manufacturing an underdrain apparatus comprising the steps of attaching a cover to a water orifice member and attaching a bottom member to said cover and said water orifice member, said cover having an inside surface, said water orifice member having an upper surface, an outside surface and an inside, said bottom member having an inside surface, said upper surface of said water orifice member and said inside surface of said cover defining an air passageway and said inside of said water orifice member and said inside surface of said bottom member defining a water passageway.

BRIEF DESCRIPTION OF THE SEVERAL VIEWS OF TEE DRAWINGS

Specific embodiments of the invention will now be described, by way of example only, with the use of drawings in which:

FIGS. 16A–16E are views illustrating a panel member according to FIG. 2 but further utilising an air distribution or scouring capability/conduit as used with water backwash according to a further aspect of the invention;

Figure 17A:
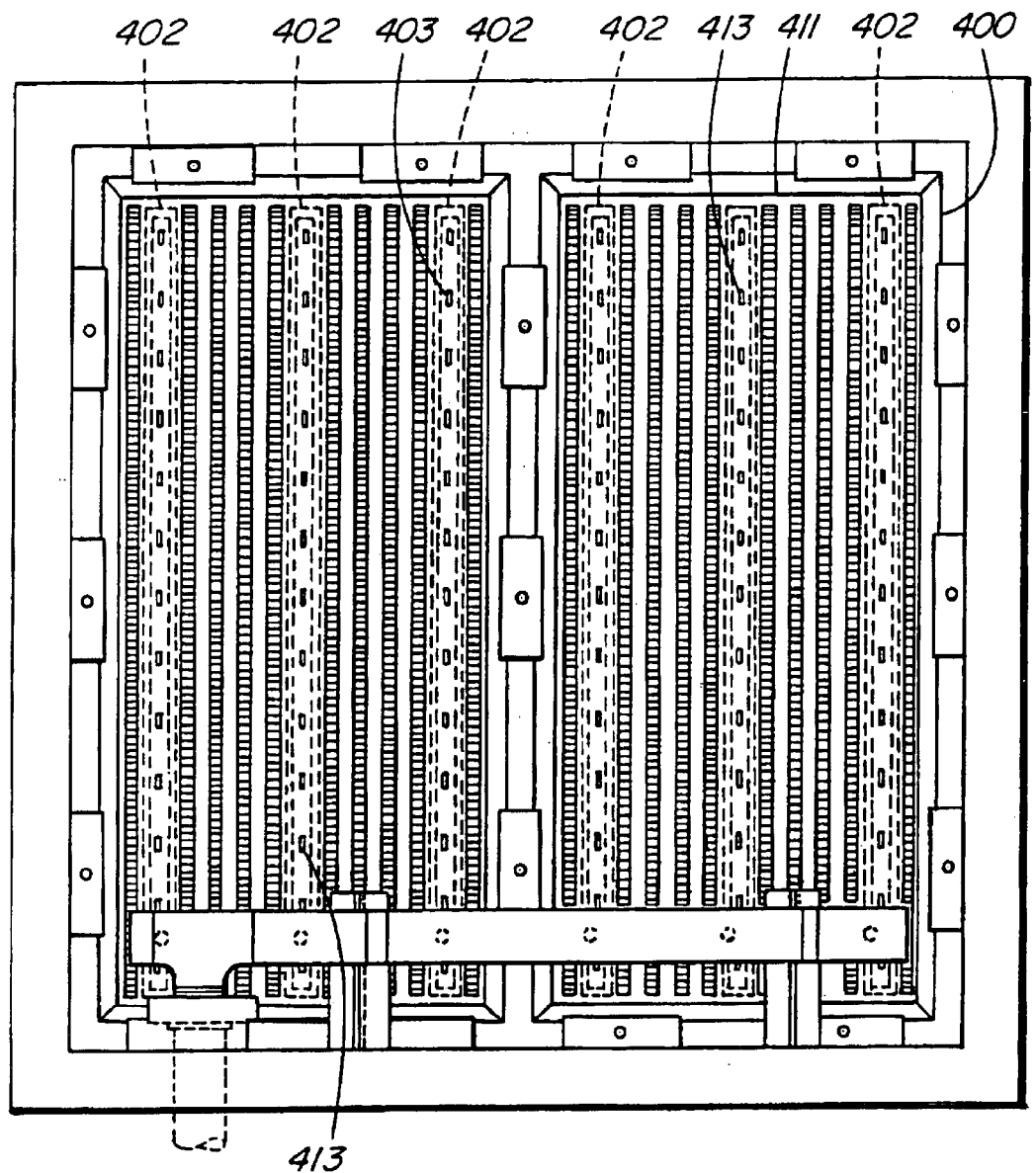
Figure 17B:
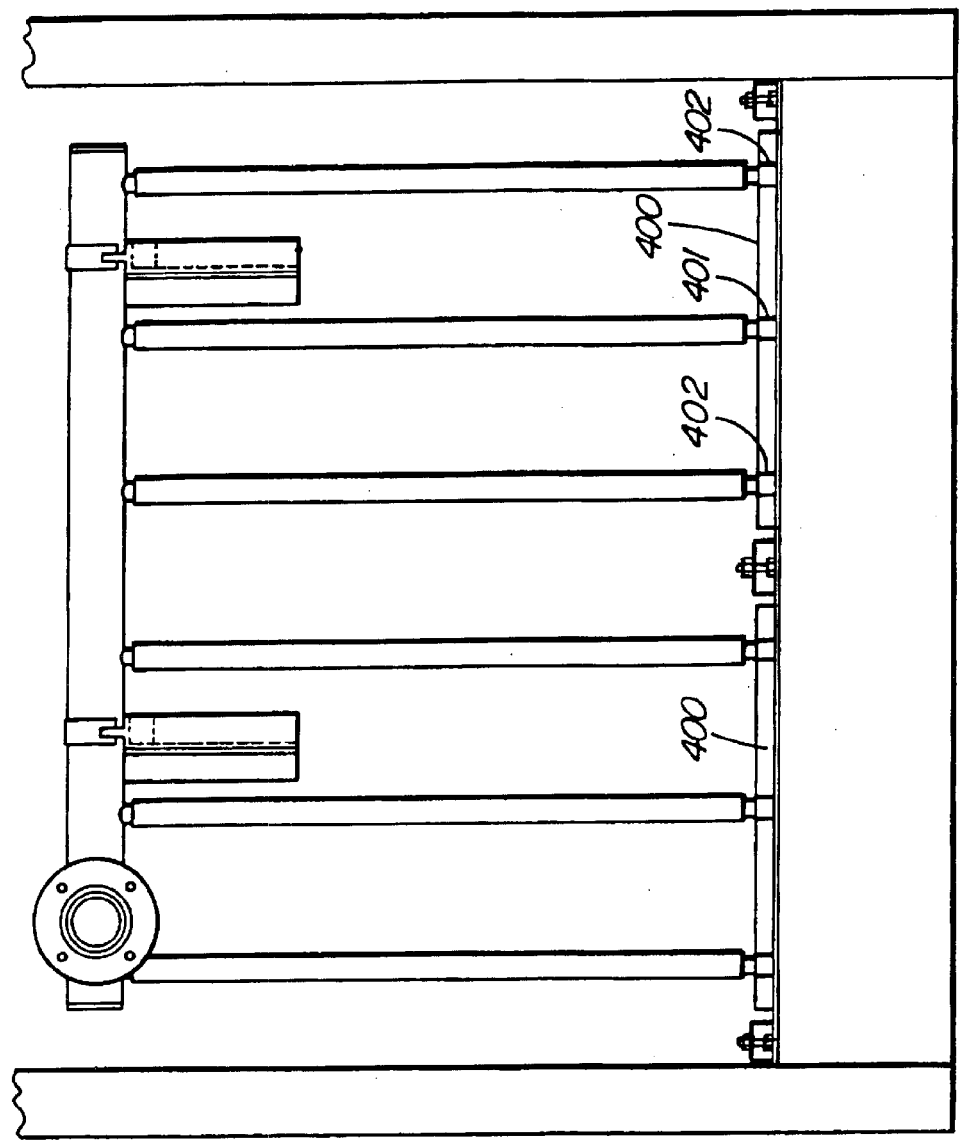
Figure 18A:
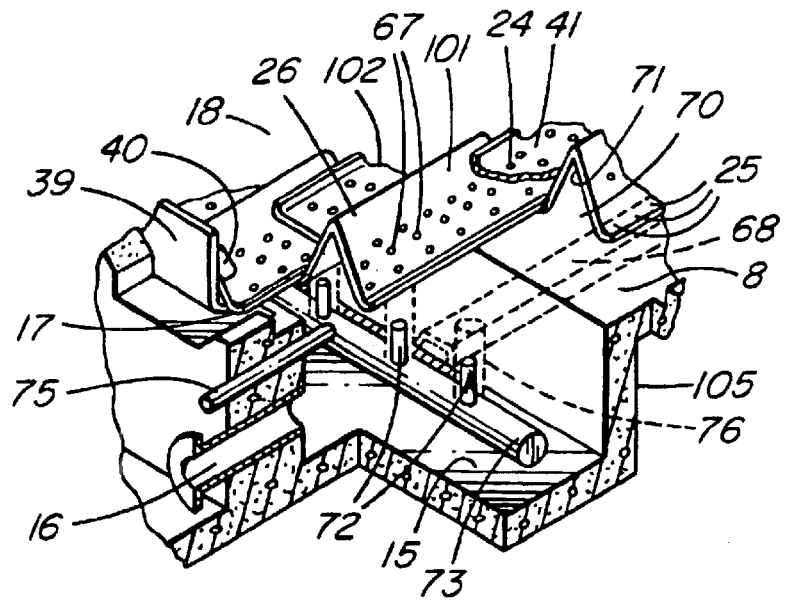
Figure 18B:
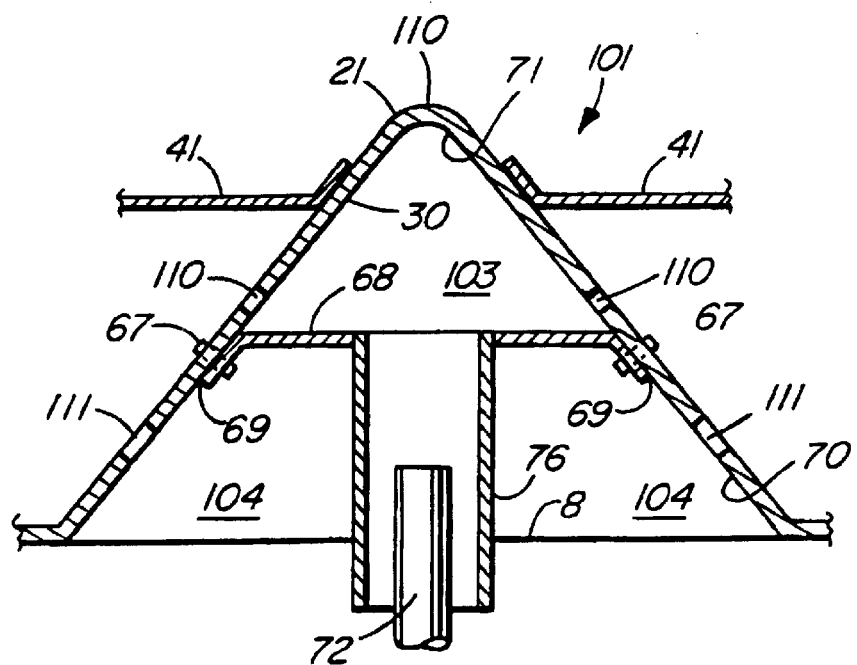
Figure 19:
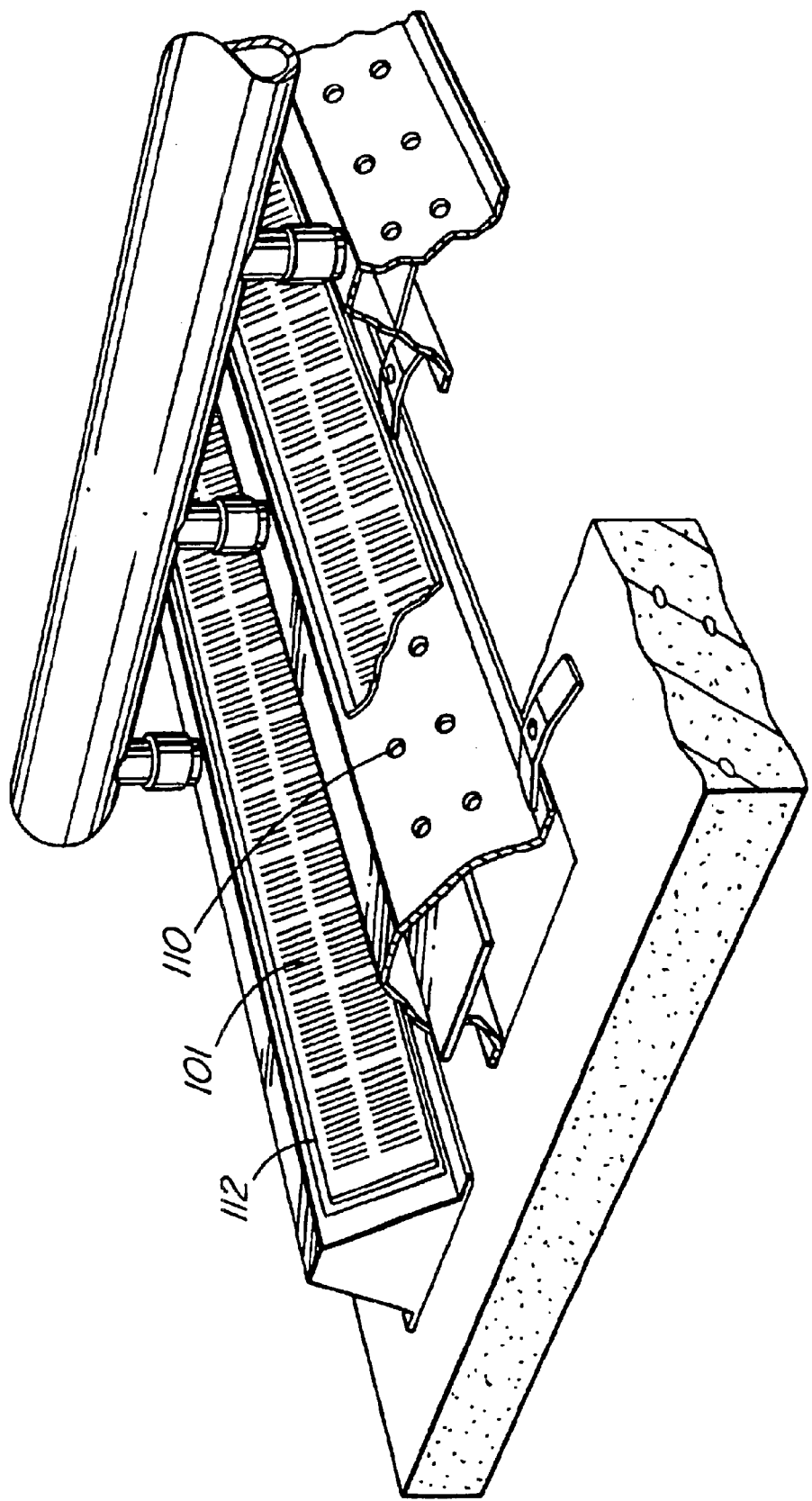
Figure 23:
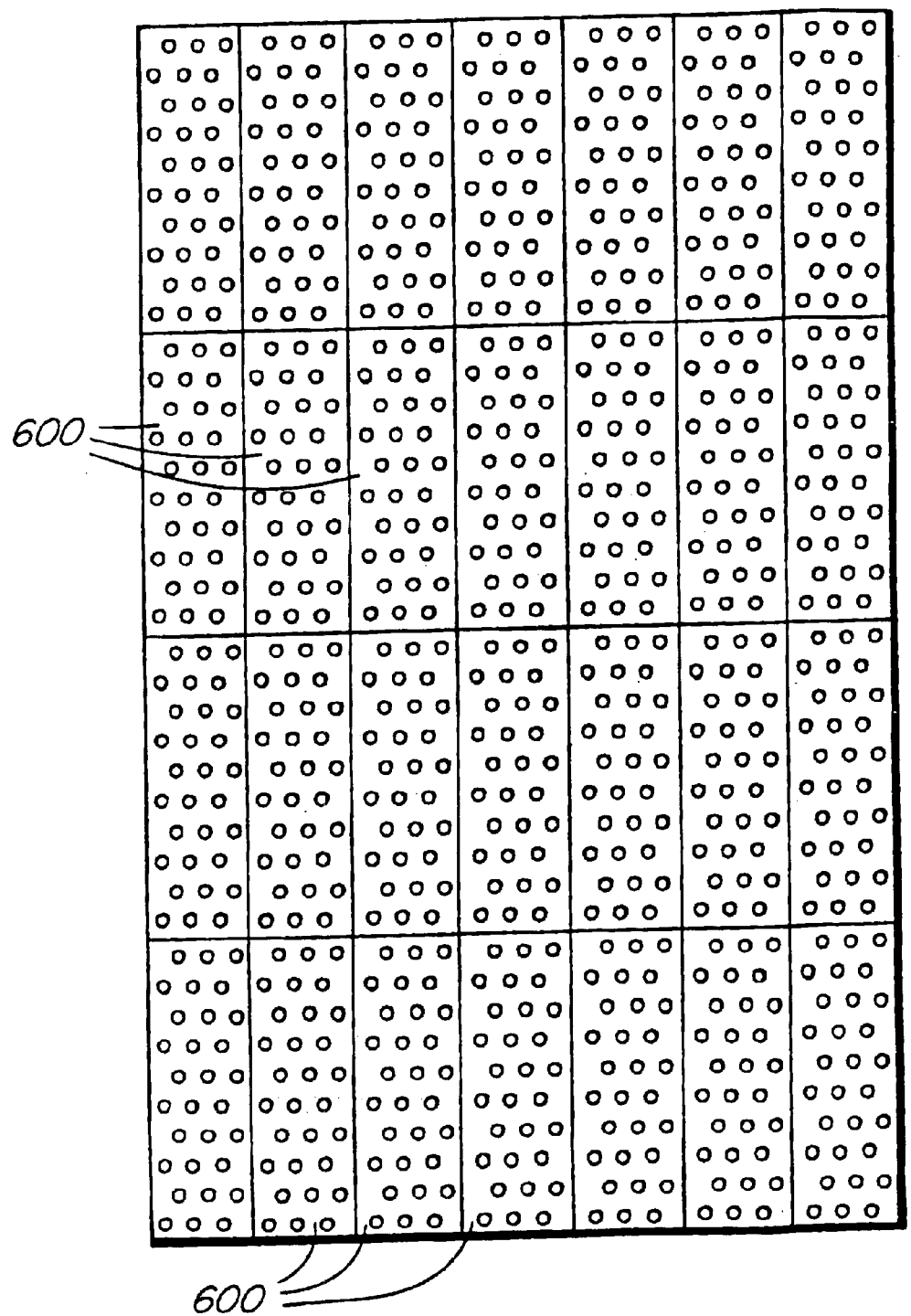
Figure 24:
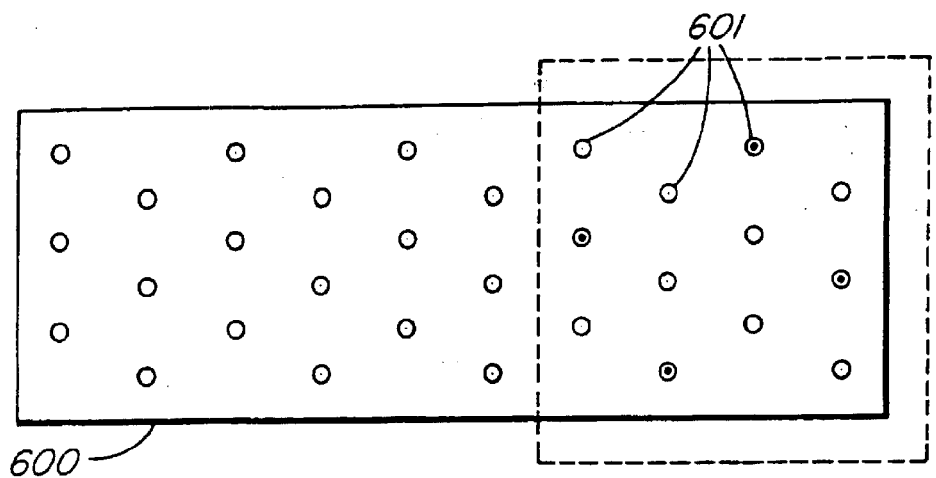
Figure 25A:
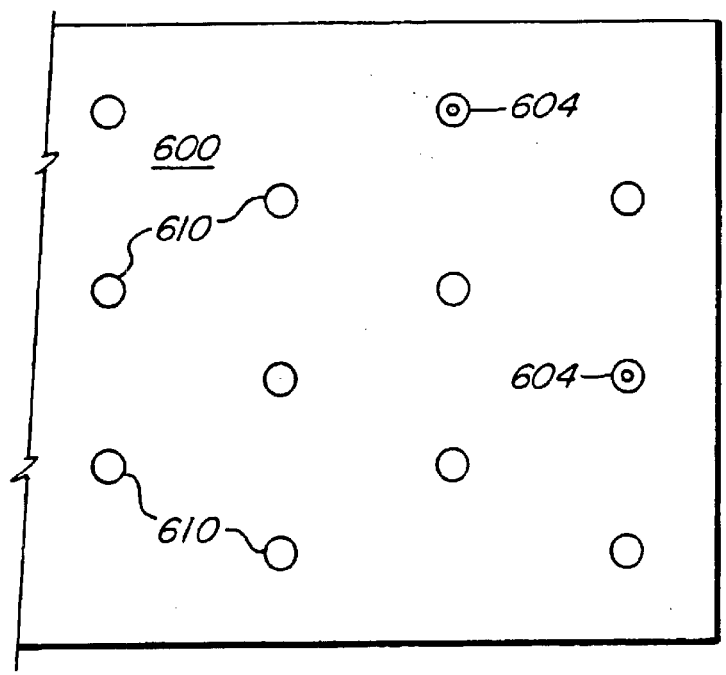
Figure 25B:
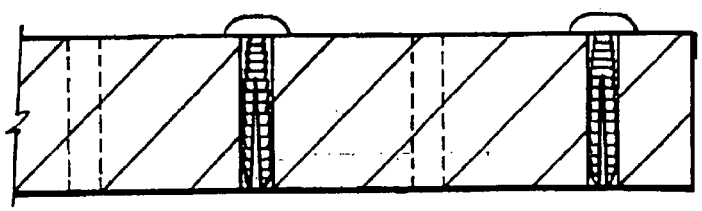
Figure 26:
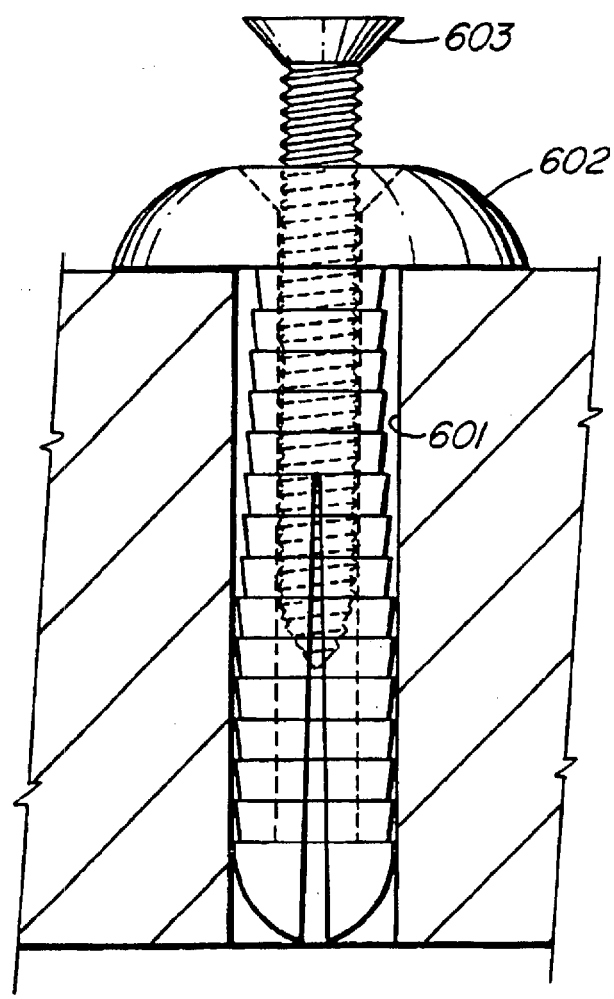
Figure 27:
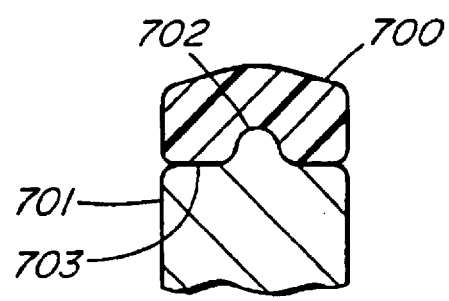
Figure 28A:
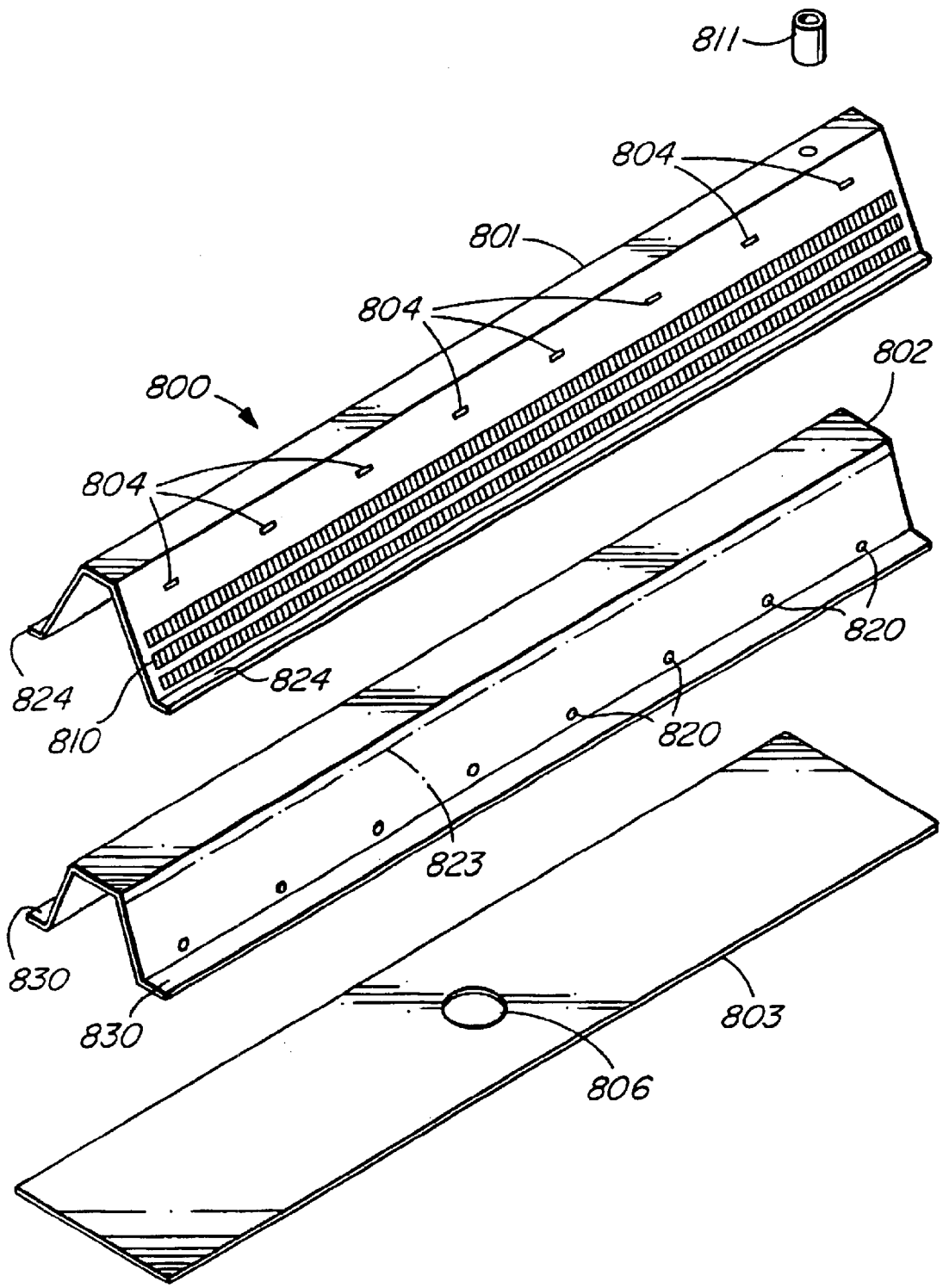
Figure 28B:
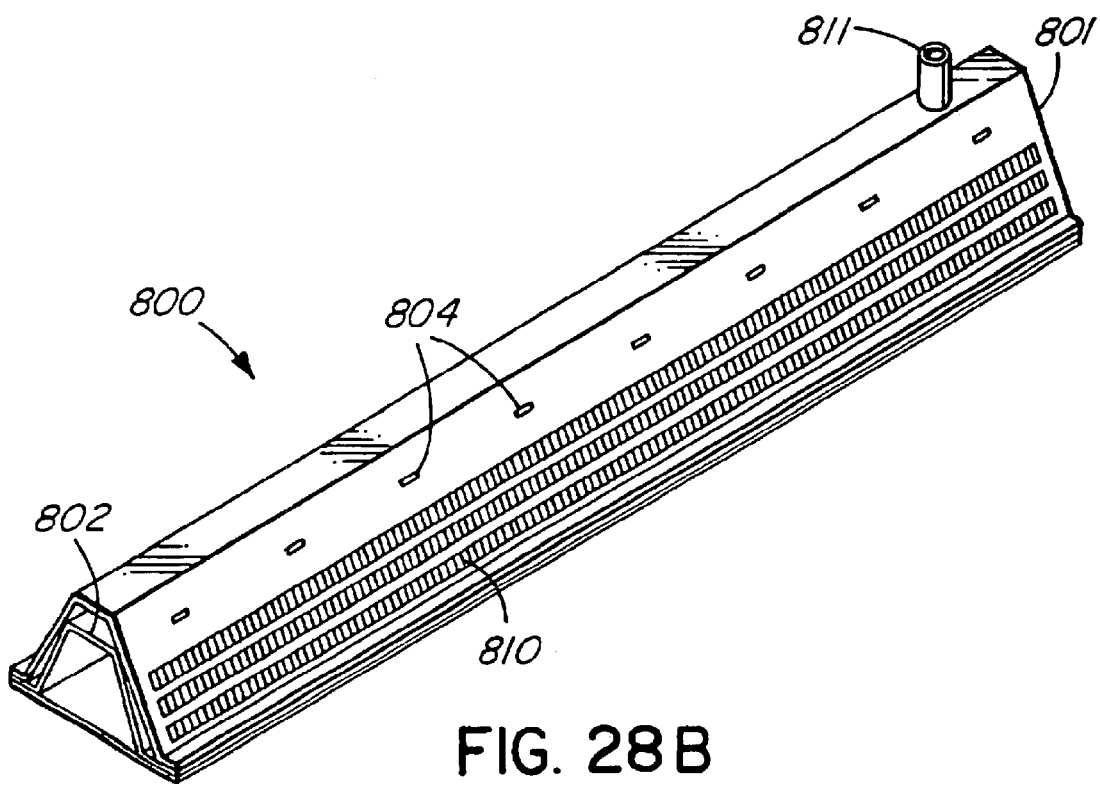
Figure 28C:
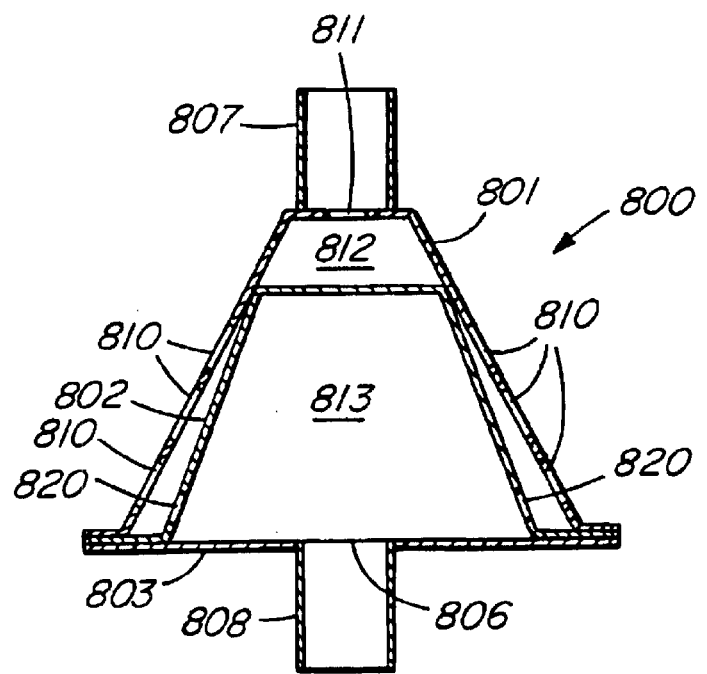
Figure 28D:
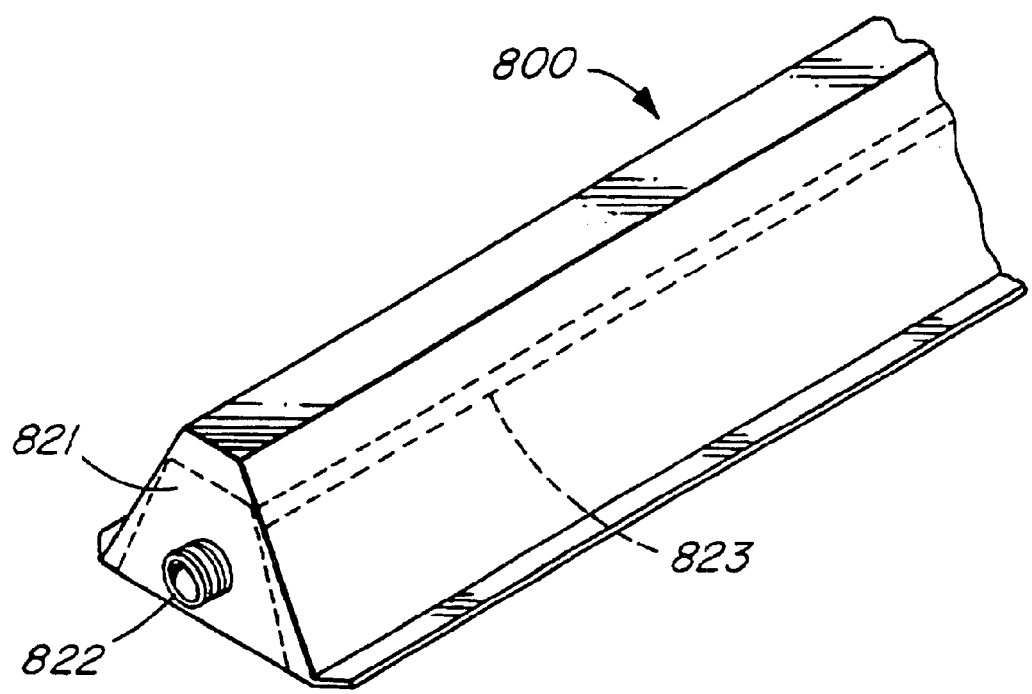

FIGS. 17A and 17B and plan and side views, respectively, of a panel member utilising air scouring according to a further aspect of the invention;

FIG. 18A is an isometric view of a backwash water/air system including longitudinal flutes or arches according to the prior art;

FIG. 18B is an enlarged elevation view of the flute or arch of FIG. 18A;

FIG. 19 is an isometric view of flutes used in a backwash water system according to a further development within the prior art;

FIGS. 20A–20C are diagrammatic views of a longitudinal flute or arch according to a further aspect of the invention which arch is used for test purposes, the figures not showing the normally used air passageway for ease of explanation;

FIGS. 21A, 21B and 21C are plan, side and partial bottom views, respectively, of an arch or flute with air scouring capability according to a further aspect of the invention;

FIG. 22 is a sectional view taken along 22—22 of FIG. 21B;

FIG. 23 is a plan view of a typical media bed illustrating the clay blocks comprising the media bed with the water orifice holes in the upper surfaces;

FIG. 24 is a plan view of a single clay block of the underdrain;

FIGS. 25A and 25B are enlarged plan and side views, respectively, of the clay block of FIG. 24;

FIG. 26 is an enlarged view particularly illustrating the plug used to block the holes of the clay block of FIG. 24;

FIG. 27, appearing with FIG. 24, is a sectional view of a seal intended to be located between the clay block and the panel member which panel member has a formed ridge or protuberance extending into the seal according to a further aspect of the invention;

FIG. 28A is an exploded diagrammatic isometric view of the underdrain apparatus according to a further aspect of the invention;

FIG. 28B is a diagrammatic isometric view similar to that of FIG. 28A but with the components of the underdrain apparatus illustrated in their assembled condition;

FIG. 28C is a diagrammatic end view of the assembled underdrain apparatus of FIG. 28B; and FIG. 28D is a partial diagrammatic isometric view of a test underdrain apparatus showing the attached end panel on one end but with an end mounted water inlet for the water passageway.

DESCRIPTION OF SPECIFIC EMBODIMENT

The media bed of an underdrain acts as a filter medium for obtaining potable water. Filtration occurs when a feedwater particle is larger than the pores between two adjacent filtering granules thereby preventing passage of the particle through the bed. Likewise, when feedwater particles pass close enough to the surface of a media granule, the particle may be adsorbed onto the granule.

As the filtering action continues, more and more spaces or pores between filtering granules become plugged. As the pores plug, the flow rates through other pores increase to maintain the set flow rate of the bed. Particles previously adsorbed in the latter pores are then subjected to higher flow rates which may strip off the particles. The number of particles exiting the filter bed may therefore actually exceed the number of particles entering the bed. To prevent this, a backwashing operation is performed. To perform backwashing, filtered feedwater is pumped up through the bed by reverse flow. This fluidizes the media and rinses out the dislocated particles from the interstitial voids. The backwash water is discharged and the filter media are then relatively clean thereby to allow commencement of a more efficient filtering action.

A significant problem associated with the backwashing operation is the non-uniform or uneven backwash water distribution which occurs because of the momentum of the water passing through the perforated header or channel. Water passing individual orifices in an underdrain at a relatively high velocity will not be discharged from the orifice as readily as when flowing at a relatively lower velocity. Hence, backwash flow through the filter underdrain will be greater in those portions of the underdrain farthest from the backwash water inlet. Over time this can cause significant disruption of the filter bed by the aforementioned "channelling" with the accompanying deterioration in filter performance.

Figure 1:
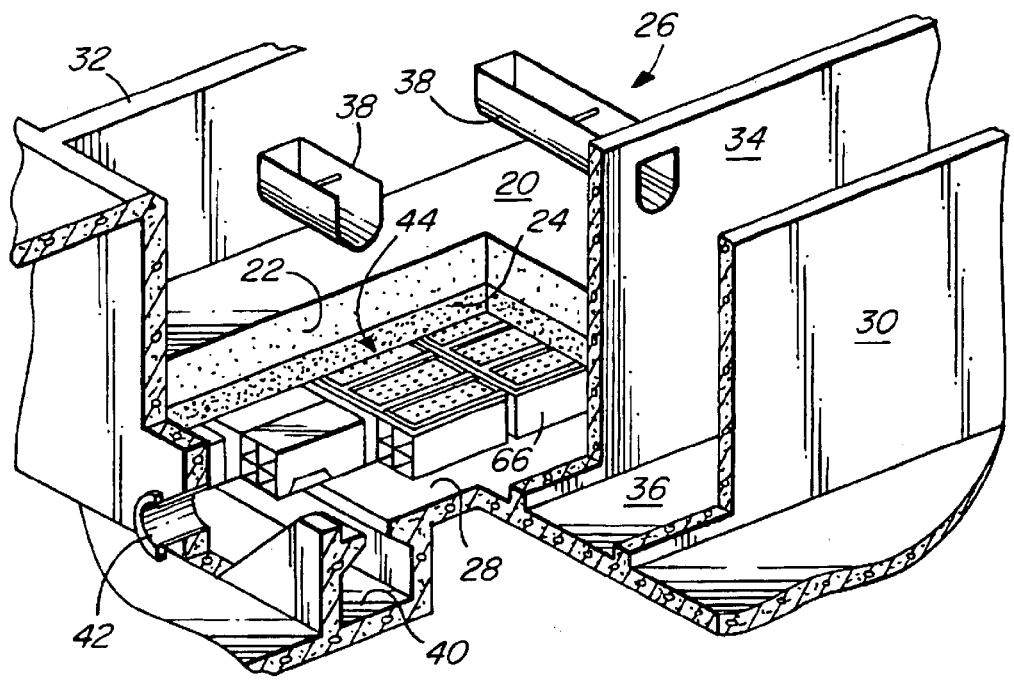
FIG. 1 is an isometric partially sectional view of a water filter tank or basin incorporating the apparatus according to the present invention.

With reference now to FIG. 1, the filter underdrain system according to the present invention is generally illustrated at 44. It is shown within a bed 20 of filter media which includes a top layer 22 of anthracite coal followed by a layer of sand 24. A supporting gravel layer is not illustrated below the sand layer 24 which gravel, however, may optionally be provided if desired.

Filters according to the prior art generally use a top layer of anthracite 22 over a layer of sand 24 as illustrated.

However, filters may operate without the anthracite layer 22. A layer of fine heavy material, such as garnet or ilmenite may also be used under the filter sand. Other filters may operate with materials such as manganese dioxide, magnesium oxide, activated carbon and the like.

The filter underdrain 44 and the bed 20 are located in a concrete, open top tank or basin generally illustrated at 26 which is defined by bottom slab 28, side walls 30 and end walls 32. A partition 34, parallel to side wall 30, defines an overflow trough or gullet 36 for receiving backwash water from semicylindrical metal, concrete or fiberglass troughs 38, which troughs 38 extend transversely of the basin 26 above bed 20 as is illustrated. The troughs 38 distribute the incoming water and discharge the collected backwash water.

A further trough or flume 40 is provided in the bottom of the basin 26 at one end thereof for receiving the backwash water. Filtered water is discharged from flume 40 via pipe 42. Pipe 42 is also used to introduce backwash water back into the flume 40, the media and then to the trough 40 and basin 26.

Referring to FIGS. 2 through 8, a filter underdrain panel according to the present invention is generally illustrated at 44. It takes a generally rectangular form which is defined by end walls 46, side walls 48 and inner panel 50. Inner panel 50 has an upper surface 52 and a lower surface 54. An elongate brace member 56 is centrally located on lower surface 54 of inner panel 50 and transverse to end walls 46. Brace member 56 is used for rigidity purposes.

Inner panel 50 further includes a multiple of generally rectangular apertures in the form of punched bridges 58 (FIG. 4), the bridges 59 being substantially equidistant from each other and arranged by row and column. Each bridge 58 defines a pair of slotted water inlet/outlet apertures. 60 (FIG. 7) through the upper and lower surfaces 52, 54 of the inner panel 50. The slotted apertures 60 are of a dimension sufficiently small to substantially prevent the passage of filter media thereby allowing for the elimination of a support layer of gravel above the panels 44 which gravel is principally used to support the sand layer resting thereon.

The end walls 46 and side walls 48 of panel member 44 also conveniently include a single row of similarly punched apertures or bridges 58 to provide for cleaning of the filter media between adjacent panel members 44.

A perimeter flange 62 has a generally L-shaped configuration in cross-section and extends outwardly from the end walls 46 and side walls 48 as is illustrated.

A gasket retention wire 64 (FIG. 9) of generally circular cross section is attached to the undersurface of the horizontal portion of perimeter flange 62. A sealing gasket 68 is positioned between the underdrain block 66 and the sealing wire 64 as will be explained.

Operation

Figure 9:
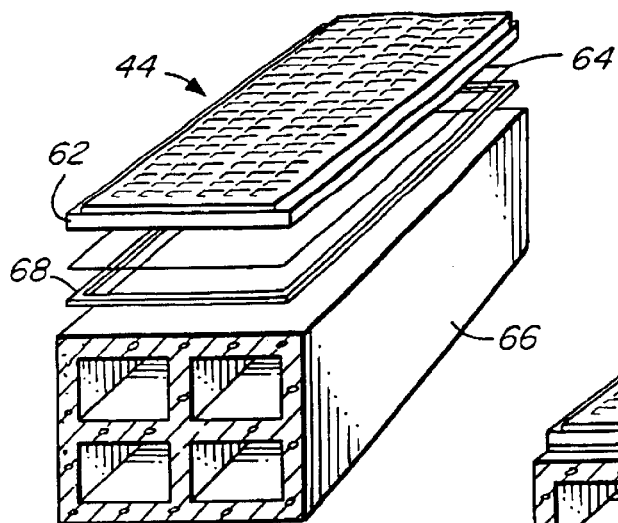
FIG. 9 is an isometric exploded view of a panel member according to the present invention particularly illustrating the relationship of the panel member and the seals, relative to the filter underdrain block.
Figure 10:
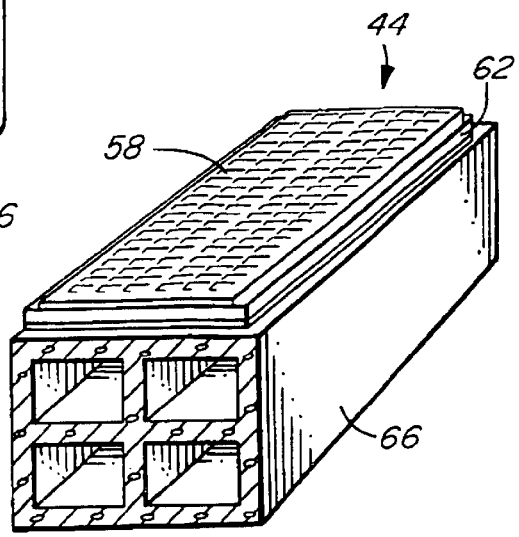
FIG. 10 is an isometric view of the assembled panel member and underdrain block of FIG. 9.

The filter underdrain panels 44 are installed on the upper surface of conventional underdrain blocks 66 with each panel 44 being dimensioned so as to form a cap for each of the underdrain blocks 66 (FIG. 9). A substantially watertight seal is formed between the panel 44 and the underdrain block 66 by inserting sealing gasket 68 made from rubber or other elastomer material between the lower surface of the horizontal wall of the perimeter flange 62 of the panel 44 and the upper surface of the underdrain block 66. The sealing wire 64 applies point pressure on the gasket 68 to ensure that the gasket 68 conforms to surface irregularities of the underdrain block 66 as well as to the undersurface of the horizontal wall of the perimeter flange 62.

Figure 11:
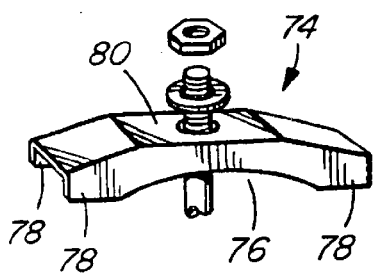
FIG. 11 is an isometric view of a clamping bracket used to secure adjacent ones of the panel members of FIG. 1.
Figure 12:
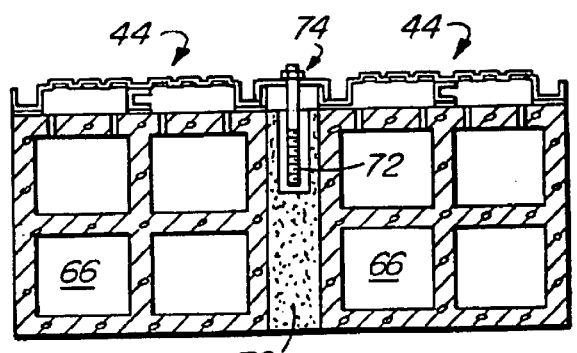
FIG. 12 is a sectional view of the panel members in a secured position on the filter underdrain blocks and further using the assembled position of the clamping bracket of FIG. 11.
Figure 13:
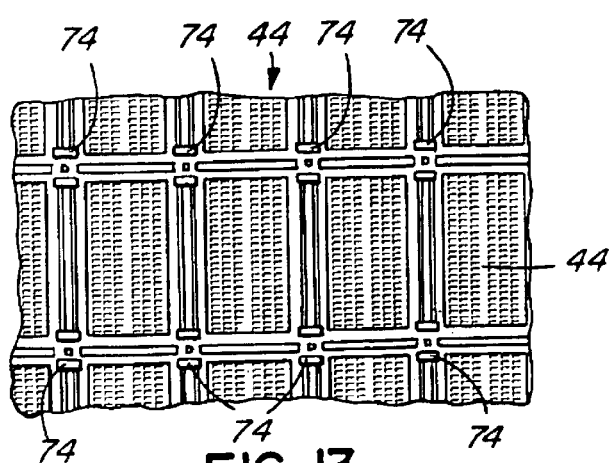
FIG. 13 is a partial plan view of the grid structure formed by securing a plurality of panel members to the filter underdrain blocks.

The placement of panels 44 in the FIG. 1 embodiment follows the placement of the underdrain blocks 66 and will result in a perforate grid like formation of panels 44 (FIGS. 12 and 13). The panels 44 are secured to the underdrain blocks 66 by drilling a perpendicular hole into the mortar 70 (FIG. 12) between adjacent underdrain blocks 66, inserting and cementing in place a non-expanding anchor 72 and utilizing a clamping bracket 74 fastened to the anchor 72 by a threaded nut. Clamping bracket 74 (FIG. 11) includes an elongate portion of rigid channel material having semicircular or elliptical cutaways 76 on either side thereof to define four(4) pads or contact areas 78, two at each end, and being substantially centered about hole 80. Hole 80 is dimensioned to allow insertion of the bracket 74 over the anchor 72 such that each of the contact areas 78 engage one corner of a perimeter flange 62 on four adjacent panels 44 while the side cutaways 76 allow clearance of the end walls 62 of panel members 44. Other methods of attachment could clearly be used.

The dual slotted apertures 60 (FIG. 7) act as water inlets during the filtration cycle and water outlets during the backwash cycle. Accordingly, the sizes of such apertures 60 are relevant since water flowing at relatively high velocity past an aperture will not be discharged through that aperture as readily as the same volume of water flowing at a lower velocity past the same sized aperture.

Thus, the number and size of the punched bridges 58 and their slotted apertures 60 incorporated into any given panel member 44 define the ratio of open space to closed space for the particular panel 44 and thereby controls the degree of water distribution into the above media bed acceptable in the particular underdrain system from each panel 44 and further prevents "jetting" of the water into the media bed. By increasing or decreasing the number of apertures 60 in any given panel 44 or, likewise, by varying the size of the slotted apertures 60, the quantity of water passing can be varied as desired.

Alternatively, the number of apertures 60 may be varied in a specific panel 44 in the event it is desirable to do so. It is important, however, to determine the number and/or size of the apertures in order to allow more water to escape when water velocity is higher and to allow less water to escape when the water velocity is lower, the objective being to obtain a relatively constant head of water over the length and cross section of the blocks 66 in the basin 26. A further consideration is to make such size sufficient to prevent the egress of the media through the panels 44.

Figure 14:
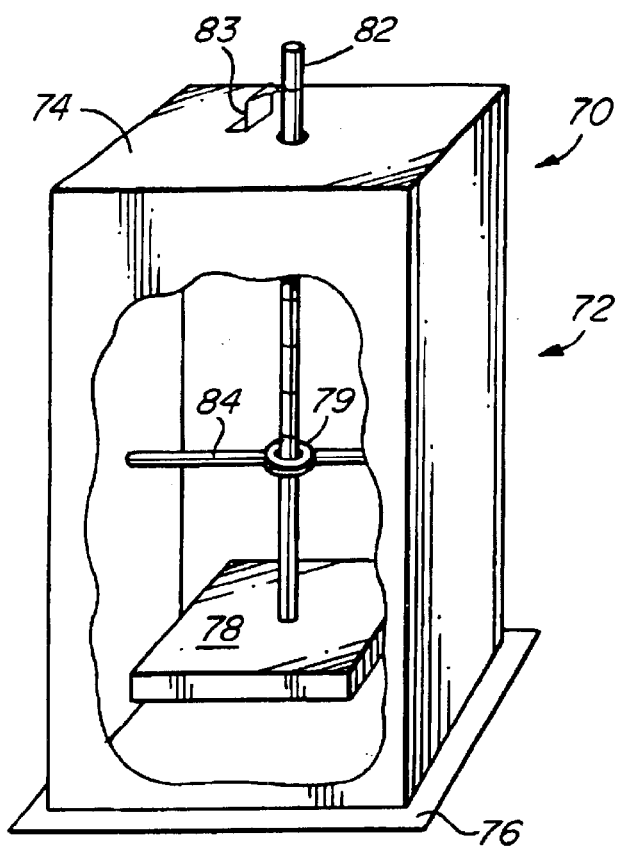
FIG. 14 is an isometric view illustrating an apparatus used to measure the hydraulic head of water according to a further aspect of the invention.
Figure 15:
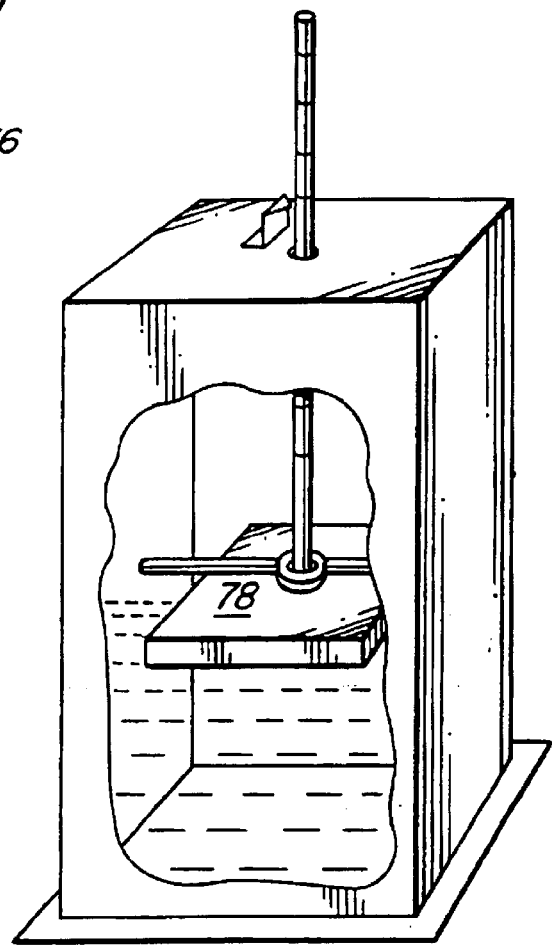
FIG. 15 is an isometric view illustrating the apparatus of FIG. 14 in its operating condition with an inflow of backwash water.

To measure the hydrostatic head along the various cells and, therefore, to determine the desired release of water from the panel members 44, reference is made to FIGS. 14 and 15. Each of the cells generally illustrated at 70 comprise an elongate, generally rectangular housing 72 having a closed upper end 74 and an open lower end 76, the lower end 76 being dimensioned with a perimeter seal 85 of a size for a typical filter underdrain element 66 (FIG. 9). The height of the housing 72 is such that since the housing 72 is intended to be attached to a filter underdrain element 66 and operates during the filter backwash cycle, the height should conveniently extend above the filter bed 20 (FIG. 1). In practice, it has been found that a housing 72 having a height of nine (9) feet is sufficient for most applications.

A float member 78 is suspended within the confines of the housing 72 and is free to rise and fall responsive to the backwash water flow 80 into the bottom of housing 72. An elongate graduated rule 82 is attached to the float member 78 with one end of the rule 82 extending through the closed upper end 74 of the housing 72. The intervals between graduations on rule 82 are conveniently three (3) inches apart. Rule 82 will rise and fall with float 78.

A reference pointer 83 is attached to the upper end 74 of the housing 72 adjacent the graduated rule 82 extending through the upper end 74 of the housing 72. The pointer 83 allows determination of the rise and fall of the float member 78 within the housing 72.

The float member 78 and the attached rule 82 are generally centralized within the housing 72 by a rod 84 mounted transverse to the sides of the housing 72. A central ring member 79 encircles the body of the graduated rule 82. Thus, sideways movement of the float member 78 within the housing 72 is restricted to a preset limit. Conveniently, mounting the rod 84 approximately seventy-eight (78) inches from the lower end 76 of the housing 72 allows sufficient lift distance for float 78.

As described in association with FIG. 1, filtered backwash water is periodically introduced into the troughs or channels 42 running beneath the false bottom and escapes upward into the filter bed via orifices in the underdrain 66 to fluidize the filter bed 20 and break loose particles trapped in the filter media. Since water flowing at a relatively high velocity across an orifice will not be discharged through the orifice as readily as when flowing at a lower velocity, flow from the underdrain elements 66 closest to the backwash water inlet 42 will tend to be less than the flow through those underdrain elements farthest from the inlet.42 thereby resulting in a difference in head and flow maldistribution. The cell 70 allows quantification of the extent of flow maldistribution by measuring the float movement thus allowing for appropriate corrective action such as increasing or decreasing the number and/or size of the perforations or apertures 60 (FIG. 7) in panels 44.

A plurality of housings 72, each being utilized to acquire a measurement of the rate of flow backwash water through an individual underdrain element 66, will provide head information across the underdrain system. Each of the individual elements or clay blocks of the underdrain system need not be tested. Rather, disparate test points are conveniently chosen. Thus, measurements are first made along a row of underdrain blocks nearest the backwash water inlet 42 followed by sample measurements in an area of blocks further from the backwash inlet 42. Conveniently, this general procedure may be repeated in columnar fashion in order to provide a more complete hydraulic water flow model representative of the existing backwash flow from the underdrain.

The lower end 76 of the housing 72 of each cell 70 is removably attached to the upper surface of a respective underdrain element 66 and a substantially watertight seal is provided. A reference level is established across each cell 70 by float 78 and the backwash cycle is commenced. As backwash water enters each cell 70 from underdrain element 66, the float 78 rises. The rate of rise of float 78 and thus the rate of flow of backwash water[]into each cell 70 is deter reed by recording the rise over a predetermined period an rule 82 moves upwardly through the upper end 74 of the housing 72 and past the reference pointer 83.

Enough measurements are recorded to build a representative hydraulic model of backwash flow distribution. Thereafter, corrective action is taken to reduce any maldistribution in the backwash flow by selectively restricting flow through certain of the underdrain panels 44 which results in increased flow through is the remaining elements. The testing procedures may be repeated following panel installation to confirm that the corrective modifications have resulted in substantially uniform flow distribution across the underdrain system.

A further embodiment of the invention relates to the V-shaped arches illustrated in our U.S. Pat. No. 5,019,259 and also illustrated in FIGS. 18A and 18B. In the prior art embodiment shown in those figures, there is disclosed a plurality of arches 101 joined together with brackets 102 and positioned over the underdrain filter media comprising clay blocks 105. The arches 101 have an air passageway 103 in addition to the water passageway 104 which allows air scouring to occur during the backwash operation. Air scouring can improve the removal of impurities in the filter media.

One problem with the arches illustrated in FIGS. 18A and 18B, however, was that media retention by the arches 101 suffered; that is, the media could frequently pass through the air and water openings 110, 111 in the arches 101 so that, over time, the media would become reduced to such an extent that media replacement was necessary. A further problem related to the need for multiple tool changes in producing the air and water holes 110, 11 in the arches 101 throughout the length of each individual arch 101.

To prevent the egress of media and to assist with reducing the number of tool changes, plates or panels 112 were attached to the arches 101 illustrated in FIG. 19 on each side of the upwardly directed portions meeting at the apex. Each of the plates 112 had a series of rectangular perforations or apertures 113 punched therein which total cross-sectional area would relate to the area of the water openings 111 in the arches 101. The water openings 111 remained in the arches 101 but their cross-sectional area was constant throughout the length of arch 101 which assisted the manufacturing process. The openings in the plates 112 were varied thereby to prevent media egress and also to adjust water release to obtain a constant discharge flow rate throughout the length of the arches 101. The number of apertures 111 in the plates 112 was likewise varied so as to allow fewer apertures further from the water inlet. In this case, the apertures 111 were all the same size.

While the plate attachment process described overcame the problems of media egress and tool changes, however, there were unnecessary manufacturing steps still present and the panels 112 were relatively expensive to produce and install due to their configuration.

Reference is now made to FIGS. 20A–20C wherein a typical arch 200 is shown. This particular arch 200 is a test arch used to determine proper replacement for arch 101 of FIGS. 18 and 19 as will be explained hereinafter but the comments made concerning arch placement and position also apply to arches normally used in actual operations. The length of arch 200 may vary according to the size of the filter and a plurality of such arches are laid side by side to cover the width of the filter. Arch 200 conveniently includes the air passageway found beneficial for air scouring. However, rather than the plurality of water holes 110, 111 of FIG. 18B, there are a plurality of rectangular openings 202 provided of identical size which are positioned intermittently along the entire length of the arches 200. As well, attachment holes 203 are provided which are used to attach plates 204, shown in greater detail in FIG. 20C.

This embodiment allows media retention thereby preventing the migration of media through the previous holes in the arches 101. As well, the individual plates 204 which are readily connected to the arches 200 may be individually designed with greater or lesser cross-sectional area in the perforations or apertures punched therein and which plates 204 may likewise be provided with a greater or lesser number of apertures 202 which may be of the same size. Thus, the amount of water exiting the plates 204 and used for backwash can be designed to be relatively consistent along the entire length of arch 200 by specifically providing plates 204 with predetermined cross-sectional openings which plates 204 are then positioned on the arch 200 where desired.

Specifically, the plates will ordinarily be designed with greater cross-sectional area by way of increased number of apertures 202 near the entranceway of the water to the arch 200 and with a decreased number of apertures 202 near the end of the arch 200 downstream from the entranceway. Once the desired water discharge is obtained, arches as generally illustrated at 500 in FIGS. 21A and 21B are produced. Arches 500 have a plurality of apertures 501 punched directly into the arches 500, which apertures 501 are conveniently horizontal and in double rows as is illustrated, although vertical apertures could also be used as well as apertures of virtually any orientation. The individual apertures 501 will be the same size but the number of such apertures 501 will typically vary, there being an increased number of apertures 501 near the water inlet 503 (FIG. 21C) and a reduced number of apertures 502 at the far end of the arches 500 as is illustrated.

The arches 500 are easier to manufacture, with the previously existing holes of variable diameter along the length being replaced with openings of consistent size but varying in number. The number of apertures selected may follow head measurement as previously described in association with FIGS. 14 and 15 or by using the removable plates 204 of FIGS. 20A–20C.

Figure 16A:
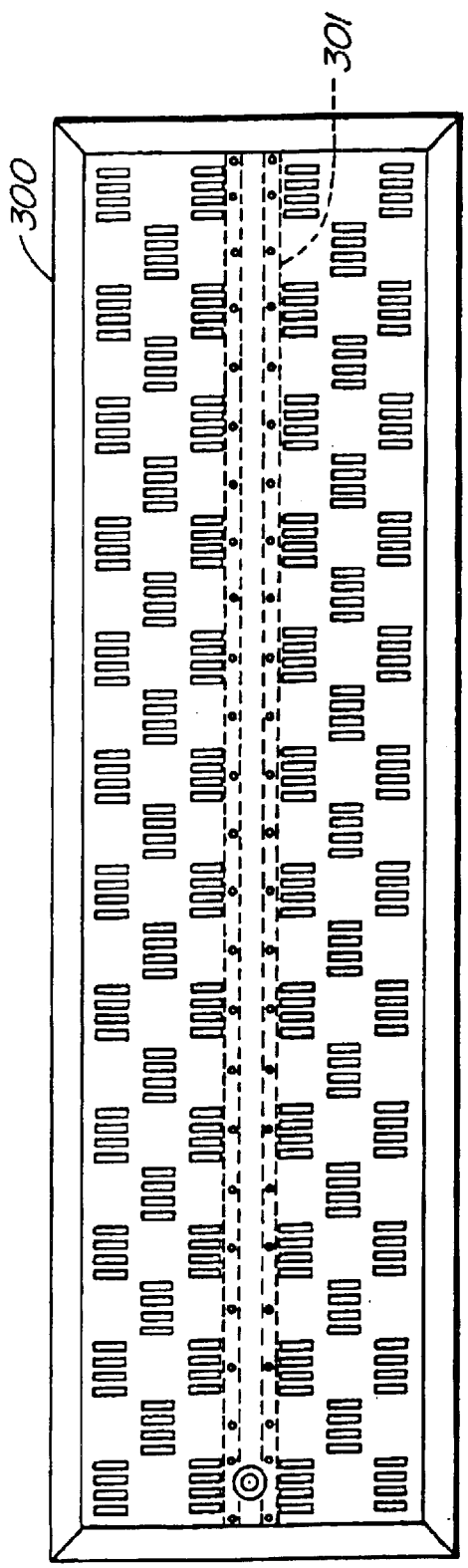
Figure 16E:
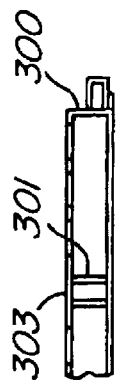
Figure 16B:
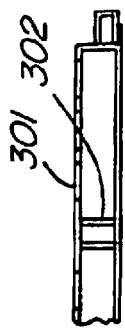

Yet a further embodiment of the invention relates to the addition of air passageways in the panel members 44 (FIG. 9) as illustrated in FIGS. 16A–16D and 17A–17B. Since air scouring has been found useful to increase the efficiency of the backwash operation, an air passageway is provided in panel member 300 in the form of an inverted hat section 301 (FIG. 16B) into which air is introduced. In a first configuration, openings 302 are provided in the hat section 301 to release the introduced air under pressure sidewise beneath panel 300. In a second configuration as illustrated in FIGS. 16D and 16E, air openings 303 are provided in the panel member 300 itself directly above the hat section 301 such that the air passing through the hat section 301 exits the section 301 upwardly from the panel where scouring takes place. This latter configuration has the advantage in that the punching operations are carried out on only one member, namely panel 300, so production costs are reduced.

Figures 2, 3:
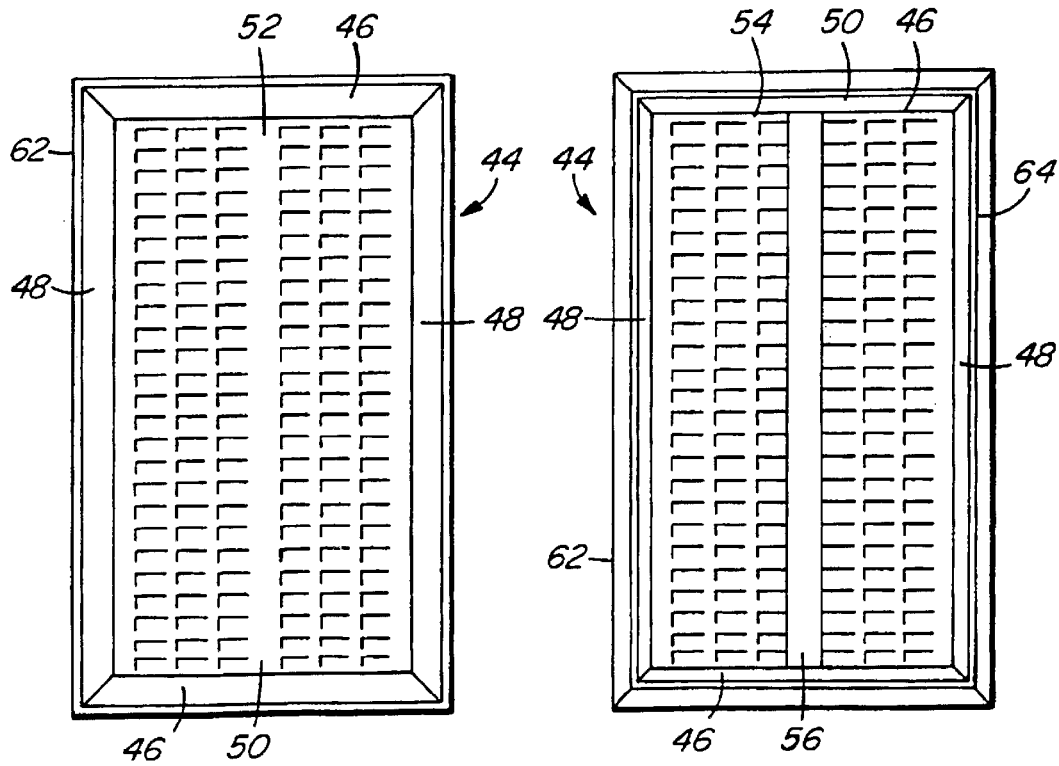
FIG. 2 is a plan view of a panel member according to the present invention.
FIG. 3 is a bottom view of the panel member of FIG. 2.
Figure 4:
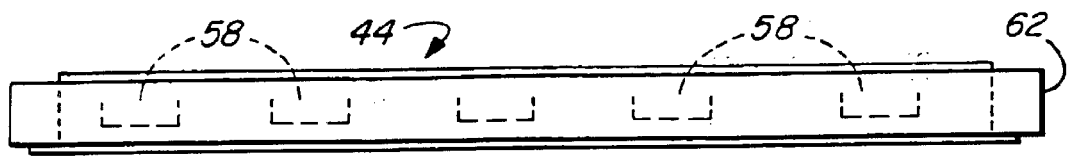
FIG. 4 is a side view of the panel member of FIG. 2.
Figure 5:
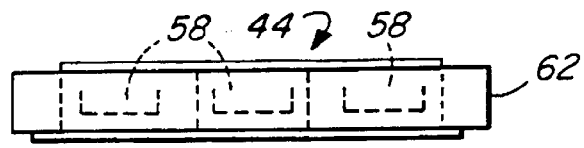
FIG. 5 is an end view of the panel member of FIG. 2.
Figure 6:
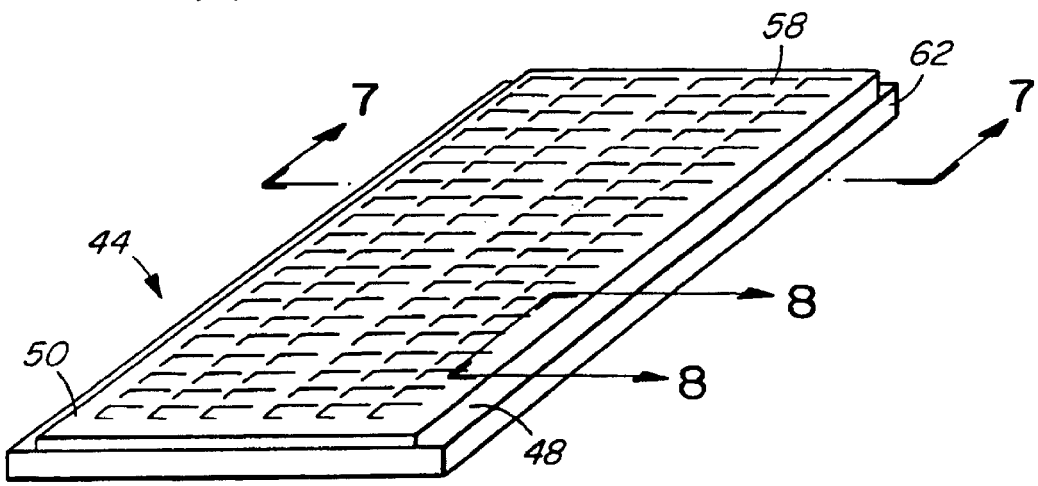
FIG. 6 is an isometric view of the panel member of FIG. 2.
Figure 7:
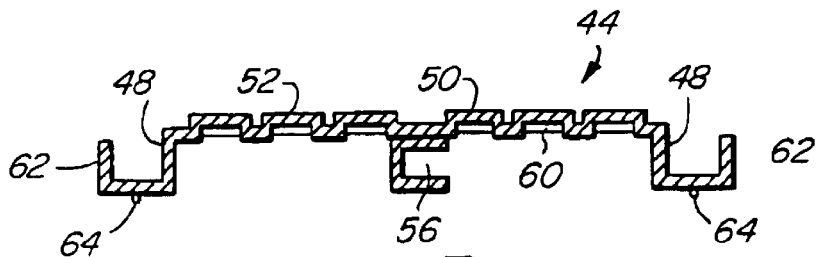
FIG. 7 is a sectional view taken along 7—7 of FIG. 6.
Figure 8:
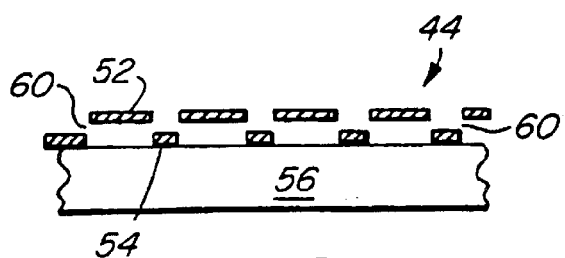
FIG. 8 is a sectional view taken along 8—8 of FIG. 6.

A further embodiment of the invention is illustrated in FIGS. 17A–17B. In this embodiment, the panel members 400 are significantly larger than the panel members 44 (FIG. 2). These panel members 400 cover a greater amount of the underdrain 66 since several filter underdrain elements or clay blocks 66 may be covered by the panel 400. A greater amount of water therefore passes upwardly through the panel member 400 and to allow for the increase in air scouring necessitated by the increase in water flow, three (3) inverted hat sections 401, 402 are used, the two side sections 402 being located equidistant from the center section 401. Otherwise, the operation is identical to the operation of the embodiment of FIGS. 16D and 16E; that is, air is introduced into each of the hat sections 401, 402 and escapes from openings 403 in the panel 400 directly above each inverted hat section 401, 402.

Although the panels 44, 300, 400 of the present invention are illustrated as being positioned as caps on conventional filter underdrain blocks 66, the panels will function effectively in the control of backwash flow maldistribution without the underdrain blocks 66 and will provide effective backwash water distribution control in any situation wherein the elements can be mechanically fastened and suitably sealed to an appropriate substructure. Likewise, while the panels 44, 300, 400 are illustrated in generally rectilinear form, the number and size of the perforations and apertures may be provided in panels of different configuration such as semicircular or triangular panels.

In yet a further embodiment of the invention, reference is made to FIGS. 23 through 26. In this embodiment, panel members which have been previously described have apertures that are all the same size and number may be positioned over the clay underdrain blocks 600 as viewed in FIG. 23. In order to allow for the correct water flow from the underdrain blocks 600, the holes 601 (FIG. 24) are selectively plugged using the nylon plug or insert 602 with a screw 603 which acts to expand the plug or insert 602 when it is inserted. With reference to FIG. 25A, two holes 604 have been plugged and the remaining holes 610 remain open and not plugged. Thus, the water flow from the block 600 is reduced a predetermined amount. Likewise, other underdrain blocks 600 may have a greater or lesser number of holes plugged, the objective being to have water outflow from the underdrain blocks 600 substantially constant over the entire underdrain are with its concomitant advantages. Thereafter, panel members which may all contain the same number and size of apertures can be used over the underdrain to prevent media egress and to allow air scouring if desired.

Reference is made to FIG. 27 in which a seal 700 is located between the panel member 701 and the underdrain block (not shown). The panel member 701 is manufactured with a rise or ridge 702 in its circumferential area 703. The ridge 702 applies pressure on one side of the seal 700 which assists in the retention of the seal 700 and which also assists the sealing action between the seal 700 and the underdrain block.

While the method of measuring hydraulic head on the underdrain system described herein uses a rule and an indicator, it should be understood that this elementary and basic measurement technique serves to best explain the technique. It is clearly contemplated that a more sophisticated measurement technique could be used, such technique using electrical analog or digital signals and such measurements being recorded through an appropriate computer interface or other recording medium. Likewise, a float need not be used. Rather, a stationary resistance measuring strip, for example, could be positioned within the measuring cell, thereby sensing the depth of water over time and transmitting such information to a receiving station located on or remotely from the transmitter. Other sensing devices are clearly usable if desired.

While the term "filter underdrain" is commonly used, the invention is not restricted to filters. Various types of water/waste and process equipment utilise improved backwash distribution which do not use filters. Examples of such equipment include up flow or down flow contact clarifiers, activated carbon contactors, ion exchange units, iron removal units, including those of the greensand/catalyzed sand type, catalyst bed contactors, including desilicizers; and neutralizing media contactors. Thus, it is intended that the term "filter underdrain" be used and understood to encompass units other than filters.

Further, in some process equipment vessels such as upflow mode filters and contact clarifiers, the underdrain serves a different function than in downflow, that is, it serves to distribute incoming service flow as well as backwash. Backwash in filter is a periodic reverse flow of filtered water through the media to flush out trapped impurities. The term is used in ion exchange and carbon contactors as well, but in filters, dirt is flushed from the bed by backwash. In ion exchange, carbon contactors and the like, water is typically filtered in advance so backwash serves to loosen and then resettle the bed to eliminate packing and flow channelling so that contact is improved and short circuiting averted in carbon contactor units. In ion exchangers a backwash is required to wash any dirt from the bed, but more to loosen and then resettle the bed so that regenerant contact is maximized and regenerant short circuiting avoided.

While the apparatus illustrated in FIG. 1 illustrates a common backwash filter system, the panels according to the present invention are adaptable to other configurations, such configurations including a transversely extending trough or flume or embedded pipe across the center width with filter outflow and backwash inlet at the side; a trough or flume or embedded pipe running the length of the filter down the center line, or along one side, or externally down one side; and circular filters with cross diameter inlet/outlet flume or trough or embedded pipe with the underdrain of the present invention running transversely to such trough or flume.

A variety of materials may conveniently be used to fabricate the filter underdrain panels 44. Painted or galvanized steel, aluminum, fiberglass, various types of plastics and fiber reinforced plastics, concrete are examples. The preferred material, however, is 304 or other grade stainless steel because of the strength and high corrosion resistance properties of this material.

Yet a further embodiment of the invention is illustrated with reference to FIGS. 28A–28C in which an underdrain apparatus according to a further aspect of the invention is illustrated generally at 800. The underdrain apparatus comprises three (3) principal and separate components, namely cover member 801, water orifice member 802 and bottom member 803. The cover member 801, the water orifice member 802 and the bottom member 803 are each conveniently made from stainless steel; 20 gauge stainless in the case of cover member 801, 18 gauge for the water orifice member 802 and 16 gauge stainless for the bottom member 803.

Cover member 801 carries the air egress slots 804 which allow air into the media to assist in the beneficial scouring action previously described herein. Cover 801 further carries the water egress slots 810 from which the water travelling through the water passageway is released into the media as will be described hereafter. The water egress slots 810 are illustrated in FIG. 28A as being in three parallel rows and of the same size. However, it is apparent that the slots 810 could be made in any desired configuration as might be required for the particular conditions under which the underdrain apparatus 800 is intended to operate. It will be appreciated that the air and water egress slots 804, 810 are formed by being punched outwardly from the plane of the cover member 801. Thus, the slots 804, 810 allow the air and water to exit sidewise on both sides of the length of the slots 804, 810. The width of the air and water openings 804, 810 may be adjusted to release more or less air or water as may be desirable in the particular operating environment. Such a configuration for the slots 804, 810 assists in preventing the migration of media through the slots 804, 810.

The underdrain apparatus 800 is shown in its assembled condition in FIG. 28B with the primary air orifice 811 shown in cover member 801 and the secondary air orifices 804 being punched out of the cover 801 as described. FIG. 28C shows more clearly the passageways, namely the air passageway 812 and the water passageway 813 formed during assembly. The water egress orifices 820 (see also FIG. 28A) lead through the water orifice member 802. The water then exits from the water egress slots 801 into the media. Water enters the water passageway 813 through hole 806 in bottom member 803 and hole 806 may be sized as desired for various operating environments.

FIG. 28D illustrates a test underdrain apparatus 800 with the end plate 821 in its assembled condition and with the water inlet 822 shown in the end plate 821 rather than in the bottom member 83 of FIG. 28A. Water inlet 822 conveys water to the water passageway 813. The test apparatus is used for testing the sealing integrity of the assembled underdrain 800.

Referring to FIG. 28D, it will be seen that there is a flat or transition area 823 in the water orifice member 802. This flat or transition area 823 is intended to match the configuration of the inside surface of cover member 801 over the transition area 823 in order that the transition area 823 of the water orifice plate 802 can be welded, conveniently spot welded, to the cover ember 801 and provide good sealing integrity over the attachment area 823.

In operation, the cover member 801, the water orifice member 802 and the bottom member 803 will all be formed prior to assembly as seen in FIG. 28A. The cover 801 and the water orifice plate 802 are welded together along the flat or transition area 823. Likewise, the bottom member 802 is welded together with the horizontal flanges 824, 830 of the cover member 801 and the water orifice member 802, respectively.

The end panel 821 (FIG. 28D) is then welded to both ends of the assembled cover member 801, water orifice member 802 and bottom member 802. Air inlet 807 is welded to the cover 801 as illustrated in FIG. 28B and a water inlet member 808 (FIG. 28C) is welded to bottom member 803 at hole 806. The underdrain apparatus 800 is then ready for installation as desired similar to the installation of the previous embodiments described.

While the attachment between the separate members is conveniently done by spot welding, it is contemplated that other techniques for attaching the members could also be used, such as by riveting or with epoxy type attachment materials.

While the materials of the underdrain apparatus are conveniently stainless steel in the embodiments described, it is also apparent that many other materials, such as composites, plastics and particularly high density plastics, various metals and metal compounds could be used. Each would be useful in particular operating environments.

While the invention has been disclosed by way of various specific examples, such embodiments are illustrative of the invention only and should not be taken as limiting its scope. Many modifications will readily occur to those skilled in the art to which the invention relates which should be limited only by reference to the accompanying claims.

We claim:

1. Underdrain apparatus for water treatment facilities comprising a cover member, a water orifice member having an upper surface and a bottom member having an inside surface, said cover member, said water orifice member and said bottom member forming an assembled apparatus, said cover member substantially enclosing said water orifice member and defining a cavity outside said water orifice member, said assembled apparatus having a first air passageway defined between said cover member and said upper surface of said water orifice member, an air inlet for said first air passageway, a first water passageway defined by said inside surface of said bottom member and said water orifice member, a water inlet to allow water to enter said first water passageway, air and water egress openings to allow the egress of air and water from said cover member, secondary water orifices in said water orifice member to allow the egress of water from said first water passageway to said cavity and thence to said water egress openings, said first water passageway being separate from said first air passageway.

2. Underdrain apparatus for water treatment as in claim 1 wherein said air egress openings are positioned in said cover member to allow the egress of air from said first air passageway.

3. Underdrain apparatus for water treatment as in claim 2 wherein said water egress openings are located in said cover member to allow egress of said water from said cover member, said water egress openings communicating with said first water passageway and said cavity.

4. Underdrain apparatus as in claim 3 wherein said air inlet is a primary air inlet orifice in said cover member.

5. Underdrain apparatus as in claim 4 and further comprising an end member connected to said cover member.

6. Underdrain apparatus as in claim 5 wherein said water inlet is located in said bottom member to allow water into said first water passageway.

7. Underdrain apparatus as in claim 6 wherein said water orifice member has a transition portion defined on said outside surface of said water orifice member, said transition portion being similar in configuration to said inside surface of said cover member, said water orifice member being attached to said cover member along said transition portion.

8. Underdrain apparatus as in claim 7, wherein said attachment of said cover member to said water orifice member is a weld.

* * * * *